March 27, 1956   C. B. ROGERS   2,739,769
ROTARY WING AIRCRAFT PROPULSION SYSTEM MOUNTING
Filed Oct. 22, 1954   2 Sheets-Sheet 1
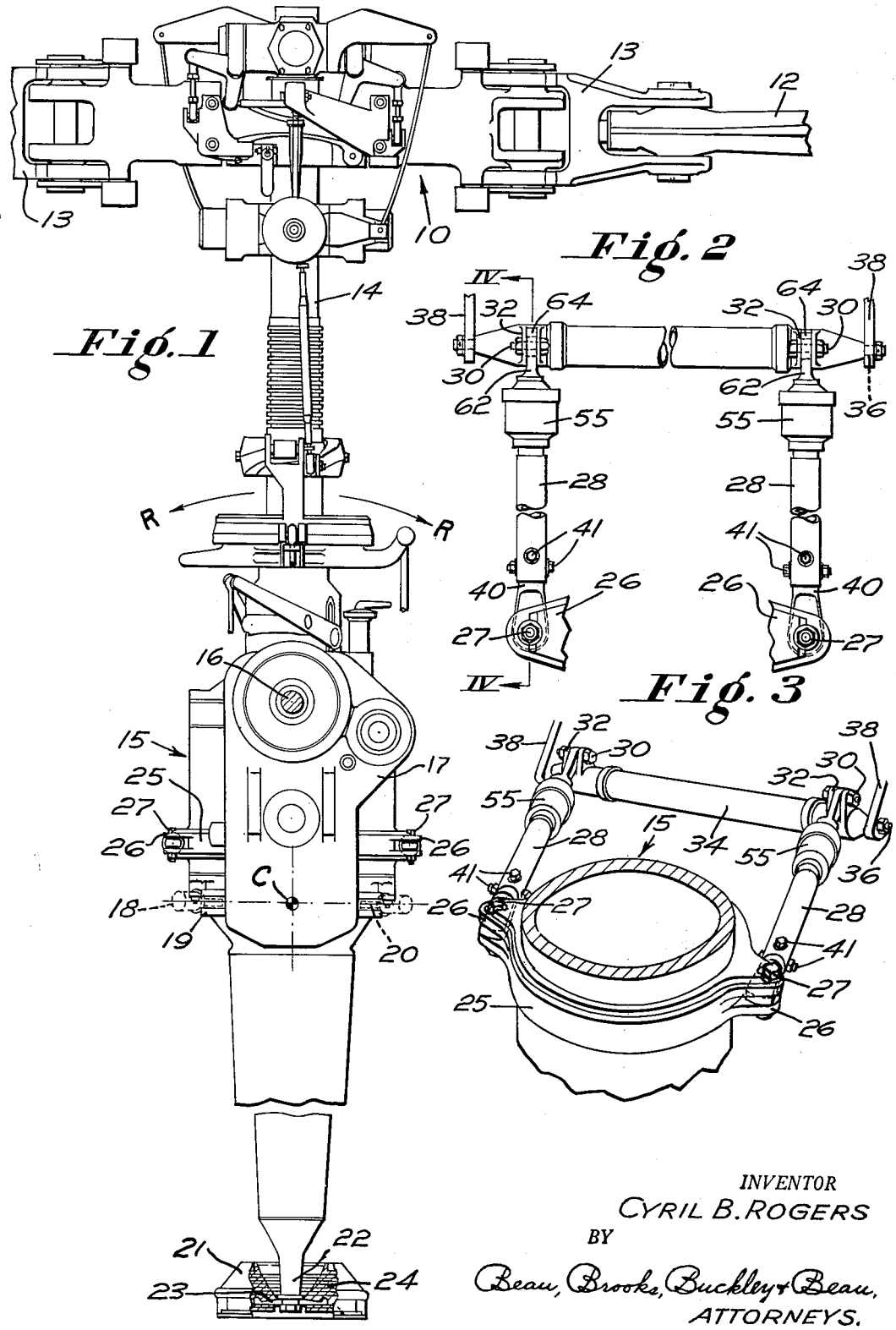
INVENTOR
CYRIL B. ROGERS
BY
Beau, Brooks, Buckley & Beau,
ATTORNEYS.

March 27, 1956  C. B. ROGERS  2,739,769
ROTARY WING AIRCRAFT PROPULSION SYSTEM MOUNTING
Filed Oct. 22, 1954  2 Sheets—Sheet 2

INVENTOR
CYRIL B. ROGERS
BY
Beau, Brooks, Buckley & Beau,
ATTORNEYS.

United States Patent Office 2,739,769
Patented Mar. 27, 1956

2,739,769

ROTARY WING AIRCRAFT PROPULSION SYSTEM MOUNTING

Cyril B. Rogers, Niagara Falls, N. Y., assignor to Bell Aircraft Corporation, Wheatfield, N. Y.

Application October 22, 1954, Serial No. 463,974

10 Claims. (Cl. 244—17.27)

This invention relates to aircraft of the type having relatively large lift or driving rotors, and more particularly to means for mounting and connecting such a rotor and its driving mechanism in such aircraft in a manner to isolate the rotor torque forces and to transmit them to the aircraft frame with zero translational motion while permitting necessary axial and rocking movements of the rotor-drive unit in the aircraft frame.

Whereas, it is now known, for example in the helicopter art, that the rotor and drive shaft and power supply mechanism therefor are preferably to be mounted in the aircraft frame by means of flexible connection devices permitting slight axial motions and rocking movements of the rotor-drive unit about axes parallel to the rotor tip path plane; it is also desirable to provide suitable means for interconnecting the rotor drive mechanism and the airframe for transmitting the rotor torque forces to the frame without interfering with such axial and rocking movements of the unit in the frame.

It is a primary object of the present invention to provide an improved mounting and connection device for the purposes aforesaid. Other objects and advantages of the invention will appear from the specification hereinafter.

In the drawing:

Fig. 1 is a fragmentary side elevational view, partly in section, of a helicopter aircraft rotor and drive shaft and power supply unit provided with a mounting and torque isolating mechanism of the present invention;

Fig. 2 is a fragmentary top plan view of the torque isolating mechanism thereof;

Fig. 3 is a top perspective view thereof;

Figure 4:
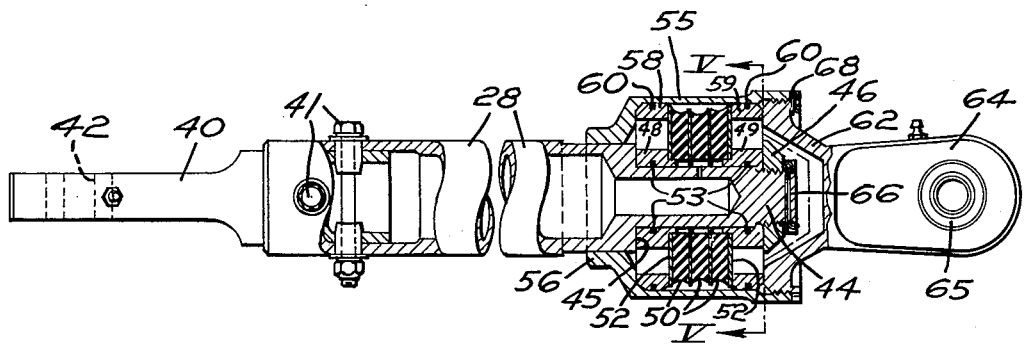
Fig. 4 is a parti-sectional and parti-elevational view taken along the line IV—IV of Fig. 2.

As shown in Fig. 1, a rotor drive unit to which the mechanism of the present invention may be applicable may comprise a helicopter lift rotor including generally a hub device 10 carrying radially extending rotor blades 12 by means of clevis brackets 13. The rotor hub unit is keyed to the upper end of a mast or drive shaft as indicated at 14 which extends at its lower end into a driving gear casing indicated generally at 15 for coupling through means of suitable gear devices (not shown) with the rotor power supply shaft such as indicated at 16 and which in turn extends laterally therefrom into connection with the aircraft power plant (not shown). Reference numeral 17 designates an accessory gear box mounted on the gear case 15. As illustrated, the gear case 15 is of vertical elongated form and is encircled by means of a support ring 18 which is carried by stationary bracket devices extending from the aircraft frame (not shown). Lugs 19 extending from the gear case 15 connect by means of pin and flexible rubber bushing devices as indicated at 20 to the ring 18. At its lower end the gear case 15 is illustrated as being provided with an axially extending stub shaft portion 22 carrying a metal disc 23 which engages within a flexible rubber bushing 24 which is held within an annular shaped pedestal bearing block 21 firmly attached to the aircraft frame.

Preferably, the mounting ring 18 and the flexible connection devices 20 are arranged to encircle the rotor drive unit at an elevation approximating the vertical position of the center about which the rotor and drive shaft and drive mechanism unit tends to rotate in response to forces acting laterally against the rotor. This arrangement is explained more fully and in detail in U. S. Patent No. 2,615,657; that invention being the result of a research project companion to the project from which the present invention resulted. Thus, the flexible bushing 24 functions to "center" or stabilize the unit in its normal upright position within the aircraft frame as shown in the drawing, and assists the connections 20 in transmitting the rotor lift forces to the airframe, but does not prevent rocking of the unit as suggested by the arrows R—R (Fig. 1) within limits, universally in any direction about a center as indicated at C defined by intersection of the plane of the connection devices 20—20 and the upright axis of the rotor unit.

However, as is well known in the rotary wing aircraft art, whenever a rotor as illustrated at 10—12 in the drawing is driven by means of an internally carried power supply plant such as through the shaft 14 and gear casing 15 of the drawing, the countertorque reaction of the rotor drive system tends to rotate the gear housing 15 in a direction opposite to the direction of rotation of the rotor blades about the upright axis of the unit. Whereas, conventionally this torque reaction may be arranged to be taken by the unit mounting bearing devices such as illustrated at 20—20, it has been found that imposition of the torque isolation function upon the lift and rocking force transmitting bearing devices seriously interferes with the proper functioning thereof.

Therefore, in the case of the present invention a special torque isolating mechanism is added to the system, and as illustrated in the drawing this may comprise either an integral or separate load ring as illustrated at 25 firmly connected to the gear housing 15 as close as practicable to the mounting ring 18, and provided with a pair of radially extending ears or brackets as indicated at 26—26 (Fig. 3). The ears 26—26 pivotally connect by means of pins 27 to corresponding push-pull members 28—28; the other ends of the push-pull members 28—28 being pivotally connected as indicated at 30 to corresponding crank arm devices 32—32 extending rigidly from a torque tube 34 which is journaled at its opposite ends as indicated at 36—36 upon fixed brackets 38—38 extending from the aircraft frame. The force members 28—28 are arranged to extend in substantially horizontal directions from the points of their connections to the rotor drive unit and to the torque tube crank arms; and the pivot connection devices as indicated at 27—27 are preferably of the ball and socket joint type, thereby avoiding interference by the torque isolating mechanism with either rocking of the power supply unit or slight axial movements of the rotor unit in the airframe. However, it will be appreciated that any tendencies of the gear housing 15 to rotate relative to the aircraft frame about the vertical axis of the rotor unit will result in simultaneous application of push and pull forces into the members 28—28, whereby one of such members will attempt to rotate the torque tube 34 in one direction while the other member simultaneously attempts with equal force to rotate the torque tube 34 in the opposite direction. Thus, the torque reaction forces transmitted through the force ring 25 into the torque isolating mechanism will be balanced out by the torque tube 34 without interference at any time with freedom of motion of the rotor and power drive unit in any other sense relative to the aircraft frame.

Figure 5:
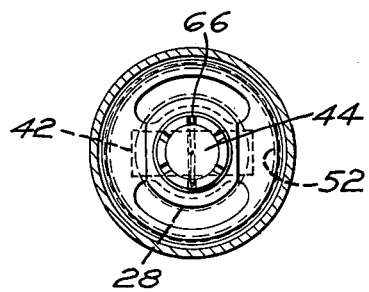
Fig. 5 is a sectional view taken along line V—V of Fig. 4.

The force arms 28 are of course preferably arranged to include shock absorbing and oscillation damping features so as to be adapted to damp the oscillations of the system incident to transmission of varying torque loads from the power transmission system and/or the rotor to the fixed airframe structure, and for cushioning the relatively severe peak loads incident thereto. To accomplish this function the force members 28 may of course be connected to the fixed structure and to the rotor casing by cushion bearings of any desired form as are known in the art or, as illustrated in Figs. 4 and 5, the struts 28 may be conveniently fabricated in each case to include in addition to the main tubular housing member 28, an end fitting 40 which is bolted to the tube 28, as indicated at 41, and terminates in an eye portion 42 which receives the connection device 27 previously referred to. Adjacent its other end the tube 28 is illustrated as being formed with a reduced diameter end portion 44, thereby providing a shoulder 45. The extreme end of the reduced diameter portion 44 is externally threaded so as to accommodate thereon a nut 46 in opposition to the shoulder 45. A pressure ring 48 is slip-fitted over the reduced diameter portion 44 against the shoulder 45, and a similar pressure ring 49 is slip-fitted over the portion 44 beneath the nut 46, and a "sandwich" of resilient rubber rings 50 and alternate steel plates 52 is disposed between the pressure rings 48—49; the sandwich rings 50—52 being of annular formation and slidably mounted upon the reduced diameter section 44 of the device.

The parts are so dimensioned and arranged that when the rubber "sandwich" is assembled between the pressure rings 48—49 and maintained in position by means of the nut 46, the rubber rings are under slight compression whereby the unit as a whole is "snug." Felt rings as indicated at 53 are provided in the peripheral surfaces of the pressure rings 48—49 to pressure-seal the sliding contacts between the rings and the external surface of the member 44. The rubber "sandwich" end portion of the unit is enclosed within a cup-shaped housing 55 which is formed with a reduced diameter end portion 56 slidably engaging upon the tubular member 28. The housing 55 also mounts therewithin a pair of pressure rings 58—59 which correspond to the pressure rings 48—49 previously referred to, and are disposed at corresponding ends of the rubber "sandwich" unit previously referred to. The pressure rings 58—59 are also furnished with felt gaskets as indicated at 60, as in the manner of the gaskets 53—53 of the pressure rings 48—49. Adjacent its outer end portion the housing 55 is internally threaded so as to receive in screwthreaded relation therein a connection member 62 which bears at its inner end against the pressure ring 59, so as to exert a slight pressure against the outer peripheral portions of the "sandwich" device. At its outer end the connection member 62 terminates in an eye portion 64 which carries a bearing member 65, which in turn engages with the connection pin 30 previously referred to. A cotter pin as indicated at 66 is provided to lock the nut 46 in assembled position, and a short cotter pin 68 is similarly provided to lock the connection member 62 in assembled relation with the housing 55 subsequent to assembly of the parts.

Thus, it will be appreciated that by reason of the construction of the force arms 28—28, as explained hereinabove, these members incorporate resiliency and oscillation damping characteristics such as will permit the members to cushion relatively severe peak loads whenever encountered, and which will also function to damp out any tendencies toward oscillation of the gear case 15 relative to the airframe about the vertical axis of the rotor unit. Such oscillations would otherwise occur incidental to variable power applications through the driving mechanism to the relatively large and heavy rotor, or might otherwise occur due to wind gusts acting against the rotor.

Thus, it will be appreciated that the torque isolating mechanism of the present invention resists the torque reaction forces of the rotor as transmitted through the power transmission housing, and transmits them to the aircraft frame with zero translational motion, while avoiding any interference with translational motion of the rotor and the power transmission housing in any direction. Nor does the torque isolating mechanism of the invention induce the transmission of translational loads to the housing. Thus, the mechanism prevents rotation of the housing 15 while allowing the rotor and the housing to move freely in any other sense; utilizing the principle of a parallelogram of forces coupled to the rotatable torsion bar 34. As a consequence, the mounting connections as indicated at 20—20 are relieved from varying torque reaction loads while at the same time permitting the rotor and drive unit to move freely to seek its own center of rotation in response to forces acting laterally against the rotor, as explained hereinabove.

Although only one form of the invention has been shown and described in detail, it will be apparent to those skilled in the art that the invention is not so limited but that various changes may be made therein without departing from the spirit of the invention or the scope of the appended claims.

What is claimed is:

1. In a helicopter aircraft having a body, a power unit including a power supply device and a shaft extending therefrom, and a helicopter rotor carried by said shaft exteriorly of said body, said unit having a center about which said unit would tend to rotate if free from restraint when under the impact of vibratory air forces directed laterally against said rotor, means universally mounting said unit in said body to hold it and to guide it to rock universally as a unit within limits about a point coinciding substantially with said center, means for elastically restraining rocking of said unit relative to said body, and torque isolating means including a pair of strut members extending in spaced relation from pivotal connections with fixed structure of the aircraft into push-pull connected relation with said power supply device and arranged to absorb torque reaction loads and tendencies thereof to oscillate about the vertical axis of said unit while permitting the latter to move freely either axially or with rocking motion about said center.

2. In a helicopter aircraft having a body frame, a power unit including a power supply device and a shaft extending therefrom and a helicopter lift rotor carried by said shaft exteriorly of said frame, said unit having a center of rotation about which said unit would tend to rotate if unrestrained in response to air forces directed laterally against said rotor, means universally mounting said unit in said frame to guide it to rock universally as a unit about a point coinciding substantially with said center of rotation while restraining the same against rotation about the axis of said shaft, said means comprising a universal pivoting means and torque-resistor strut means pivotally connecting said unit to said aircraft body frame, said universal pivoting means having its center of universal pivoting substantially coinciding with said center of rotation about which said unit would tend to rotate and said strut means resisting torque induced rotation of said unit about the axis of said shaft, and centering means connected to said unit at a point spaced from said center of rotation for elastically restraining rocking of said unit and biasing said unit toward a position of normal centered attitude in said body frame.

3. In a helicopter aircraft having a body, a power unit including a power supply housing and a vertical shaft extending therefrom and a helicopter lift rotor carried by said shaft exteriorly of said body, means mounting said unit in said body to resiliently hold it, said means including a torque tube rotatably mounted upon fixed structure of the aircraft and having a pair of crank arms extending therefrom in spaced parallel relation, a pair of strut members extending horizontally in spaced relation from pivotal connections with said crank arms respectively into push-pull connected relation with said housing while being arranged to permit the latter to move freely either vertically or with rocking motions about horizontal axes, said push-pull members being arranged to absorb rotor torque reaction loads and tendencies of said housing to oscillate about the vertical axis of said unit shaft.

4. In a helicopter aircraft having a body frame, a power unit including a power supply housing and a shaft extending therefrom and a rotor carried by said shaft, means mounting said unit in said frame to hold it and to permit it to rock within limits universally and to move within limits axially within said frame while restraining said unit against rotation about the axis of said shaft, said means comprising flexible connection means, centering means, and anti-torque strut means restraining rotation of said unit about the axis of said shaft in said body frame.

5. In a helicopter aircraft having a body, a lift unit comprising a power supply device having a drive shaft extending therefrom and a lift rotor carried by said shaft exteriorly of said body, said lift unit having a center about which said unit would tend to rotate if free from restraint when under the impact of vibratory air forces directed laterally against said rotor, means mounting said unit in said body to permit it to rock universally as a unit, within limits, said means comprising a universal pivot connection means mounting said unit in said aircraft, said pivot connection means having its center of universal pivoting substantially coinciding with said center about which said unit would tend to rotate, means elastically restraining such rocking of said unit relative to said body, and rocker strut means extending from said body into connection with said power supply device to restrain the latter from rotating about the axis of said drive shaft without interference with rocking and axial motions of said unit, said rocker strut means including a torque tube journalled for rotation in bearings mounting said tube upon said aircraft body, said torque tube having a pair of crank arms extending in like direction from opposite ends of said tube, and a pair of push-pull struts pivotally connected at their opposite ends, respectively, with said crank arms and with said power supply device at opposite sides thereof relative to the axis of said drive shaft.

6. In a helicopter aircraft having a body frame, a power unit including a power supply device and a rotating drive shaft extending therefrom and a rotor carried by said shaft exteriorly of said frame, said unit having a center about which said unit would tend to rotate if free of restraint when under the impact of a force directed laterally against said rotor, means mounting said unit in said frame to guide it to rock universally as a unit within limits, about a point coinciding substantially with said center, said means comprising a universal pivot connection means for mounting said unit in said aircraft frame, resilient means connected to said unit at a point spaced from said center for elastically restraining rocking of said unit relative to said body frame, and independent anti-torque strut means extending between and pivotally connected to said frame and to said power supply device to provide restraint independently of the other mounting means against rotation in said frame of said power supply device.

7. In a helicopter aircraft having a body, a power unit including a power supply device and a shaft extending therefrom, and a helicopter rotor carried by said shaft exteriorly of said body, said unit having a center about which said unit would tend to rotate if free from restraint when under the impact of vibratory air forces directed laterally against said rotor, means universally mounting said unit in said body to hold it and to guide it to rock universally as a unit within limits about a point coinciding substantially with said center, means for elastically restraining rocking of said unit relative to said body, and torque isolating means including a pair of strut members extending in spaced relation from pivotal connections with fixed structure of the aircraft into push-pull connected relation with said power supply device and arranged to permit the latter to move either axially or with rocking motions about said center while resiliently absorbing torque reaction tendencies of said power supply device to oscillate about the vertical axis of said unit.

8. In a helicopter aircraft having a body frame, a power unit including a power supply device and a shaft extending therefrom and a helicopter lift rotor carried by said shaft exteriorly of said frame, said unit having a center of rotation about which said unit would tend to rotate if unrestrained in response to air forces directed laterally against said rotor, means universally mounting said unit in said frame to guide it to rock universally as a unit about a point coinciding substantially with said center of rotation, said means comprising a universal pivoting means and a resilient torque-resistor strut mechanism pivotally connecting said unit to said aircraft body frame, said universal pivoting means having its center of universal pivoting substantially coinciding with said center of rotation about which said unit would tend to rotate and said strut mechanism resisting torque induced rotation of said unit about the axis of said shaft, and centering means connected to said unit at a point spaced from said center of rotation for elastically restraining rocking of said unit and biasing said unit toward a position of normal centered attitude in said body frame.

9. In a helicopter aircraft having a body, a power unit including a power supply housing and a vertical shaft extending therefrom and a helicopter lift rotor carried by said shaft exteriorly of said body, means mounting said unit in said body to resiliently hold it, said means including a torque tube rotatably mounted upon fixed structure of the aircraft and having a pair of crank arms extending therefrom in spaced parallel relation, a pair of strut members extending horizontally in spaced relation from pivotal connections with said crank arms respectively into push-pull connected relation with said housing, said torque tube and said strut members being arranged to permit said housing to move either vertically or with rocking motions about horizontal axes while elastically absorbing rotor torque reaction loads and tendencies of said housing to oscillate about the vertical axis of said unit shaft.

10. In a helicopter aircraft having a body frame, a power unit including a power supply device and a rotating drive shaft extending therefrom and a rotor carried by said shaft exteriorly of said frame, said unit having a center about which said unit would tend to rotate if free of restraint when under the impact of a force directed laterally against said rotor, means mounting said unit in said frame to guide it to rock universally as a unit within limits about a point coinciding substantially with said center, said means comprising a universal pivot connection means for mounting said unit in said aircraft frame, resilient means connected to said unit at a point spaced from said center for elastically restraining rocking of said unit relative to said body frame, and independent torque isolating means including a torque tube connected to said frame and anti-torque strut means extending between and pivotally connected to said tube and to said power unit to provide elastic restraint independently of the other mounting means against rotation in said frame of said power supply device.

References Cited in the file of this patent

UNITED STATES PATENTS

| | | |
|---|---|---|
| 2,395,143 | Prewitt | Feb. 19, 1946 |
| 2,615,657 | Young | Oct. 28, 1952 |